Nov. 22, 1938.  L. M. WRIGHT  2,137,374
TREATMENT OF TEA
Filed Dec. 6, 1937  2 Sheets-Sheet 1
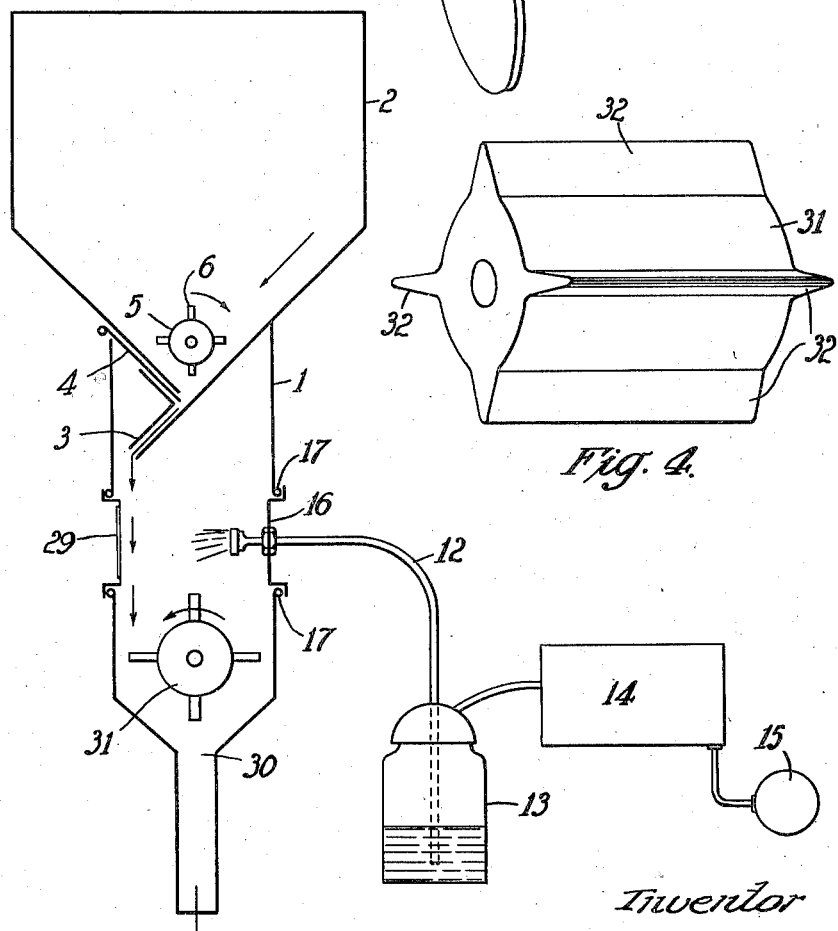
Inventor
Leonard M. Wright
By [signature]
Atty.

Nov. 22, 1938.  L. M. WRIGHT  2,137,374
TREATMENT OF TEA
Filed Dec. 6, 1937  2 Sheets-Sheet 2
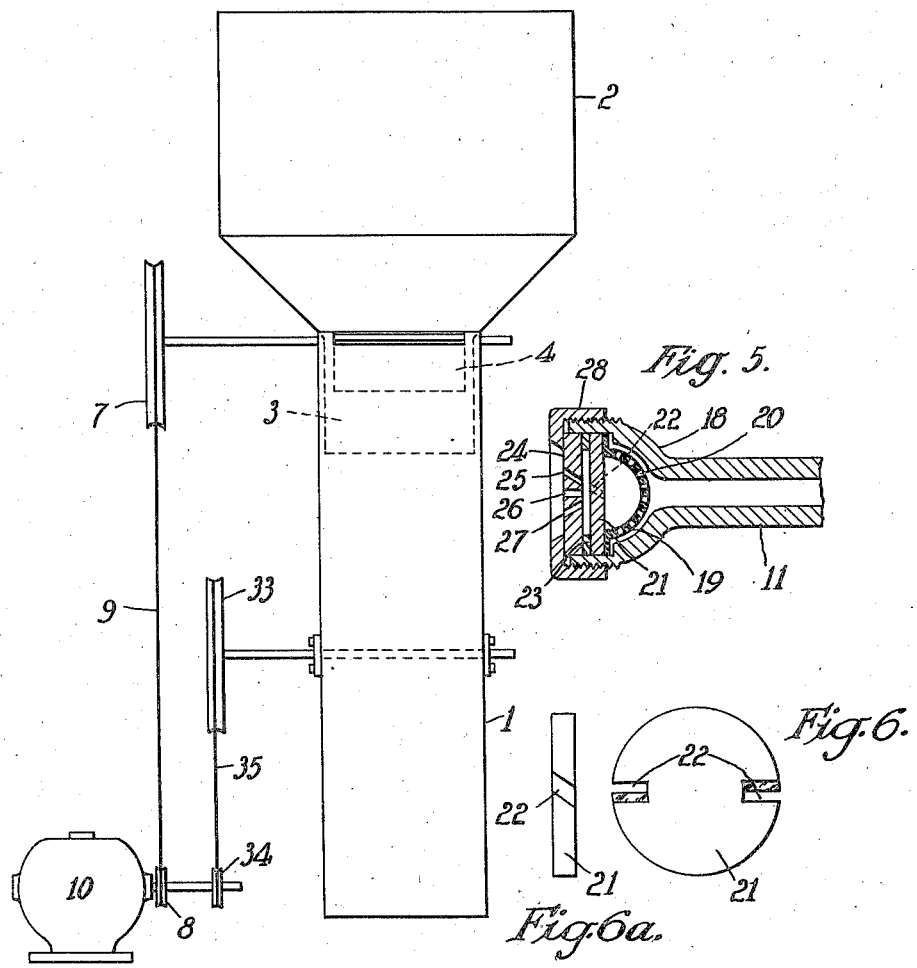

Patented Nov. 22, 1938

2,137,374

UNITED STATES PATENT OFFICE 2,137,374

TREATMENT OF TEA

Leonard Morton Wright, Dunedin, New Zealand

Application December 6, 1937, Serial No. 178,405
In New Zealand November 14, 1936

1 Claim. (Cl. 99—76)

This invention relates to the treatment of tea.

The object of the present invention is to provide a palatable tea having either a lemon or an orange flavor as may be desired.

At present many users of tea provide a slice of lemon in the cup the flavor of which is imparted to the drink.

So far as the inventor is aware, however, no commercially successful process has heretofore been evolved in which the tea leaves themselves prior to packing for sale have been so processed as to be imbued with either a desired lemon or orange flavor.

According to the process of the present invention the tea leaves whilst passing through a container are subjected to the action of a spray or mist of orange oil or lemon oil from which oils the terpenes have been completely or substantially completely removed.

In devising the process of this invention many technical difficulties had to be overcome, in particular the process to be employed had to avoid any possibility of the tea being excessively dampened while, at the same time, care had to be taken to avoid any possibility of undesirable fermentation of the tea occurring after treatment.

I am aware that a process has been proposed wherein the tea leaf is mixed with the juice or essential oil or both of lemons, limes or oranges or of mixtures thereof whereafter the treated tea leaf is fired but this process does not give satisfactory results. Likewise I have found that satisfactory results are not obtained by merely steeping the tea leaves in lemon oil or orange oil from which the terpenes have been completely or substantially completely removed and thereafter drying the same.

By my invention, however, the treated tea is not materially affected in its lasting and keeping qualities the imparted flavor being substantially retained for a period of say six months, while an extremely palatable beverage is obtainable.

According to the process of this invention, I have found that it is necessary to use lemon oil or orange oil, as the case may be from which terpenes have been substantially completely removed. The essential oils of lemon or orange, as the case may be, are not satisfactory for the purposes of the present invention. The terpene may be substantially extracted in any known and suitable manner.

According to an embodiment of the invention the aforesaid lemon oil or orange oil, as the case may be, so treated as to remove substantially completely the terpene content, is sprayed under pressure in an atomized form, or in as fine a spray as possible on to the tea leaves as they pass, preferably in a vertical stream, through a container in such a manner that during such passage of the leaves the said oil becomes intimately mixed with the leaves.

In an embodiment of apparatus for carrying the process of the invention into effect, I provide a preferably vertically disposed container into the upper end of which fits a hopper into which the tea leaves are fed. The connection between the said hopper and the said container is preferably such that the tea enters the container at an angle which causes the tea to fall within the container near to that side thereof which is opposite the side from which the spraying nozzle projects into the container. Suitable regulating means such as a suitably adapted sliding shutter may be provided in or near the bottom of the hopper or towards the upper end of the container for regulating the flow of tea as may be desired.

Just above the restricted outlet from the hopper I prefer to dispose suitably actuated agitating means to ensure the free movement of the tea leaves. In one form the agitating means may comprise a horizontally mounted cylinder having outwardly projecting teeth, beaters, fins or the like, the cylinder or drum being actuated from any convenient source of power as by a belt drive from a suitably disposed electric motor.

The oil is introduced into the container preferably about half way up through a suitable nozzle, a flexible lead connecting the nozzle stem to the supply container of the oil, such oil container itself being in communication with any desired source of pressure supply such as a reservoir tank supplied from an air pump the pressure utilized being about 50 lbs. per square inch. The nozzle, in its preferred form, is mounted on a door provided in the side of the container, the door being stamped out in a manner similar to that employed in making lids for lever lid tins, the edges of the orifice in the container for receiving said door being conveniently beaded.

The nozzle passes through a suitably disposed and shaped orifice in said door to which its shank or stem is secured in any known and suitable manner.

The nozzle itself comprises an enlarged head portion and as the oil passes from the stem into such head, it has to pass through a preferably copper colander shaped receptacle which acts as a strainer having a plurality of holes of suitable size therein. Directly in front of the colander is a preferably brass disc with preferably two opposed angle slots cut in its edge to impart a whirling movement to the incoming oil. Preferably a packing ring of leather or other suitable material is disposed between such brass disc and an oil spray diffuser positioned immediately in front of such packing ring. The spray diffuser which may be in the form of a disc is provided with three holes in vertical alignment. Preferably each hole is 1/64th of an inch in diameter and the two outer holes are bored through the disc at an angle so that the upper outer hole tends to spray the atomized oil upwardly while the outer lower hole tends to spray the oil downwardly. The various component parts within the nozzle head are held in position by a suitable retaining cap adapted to be screwed on to the threaded outer periphery of the nozzle head.

Preferably immediately opposite the nozzle retaining door is provided an inspection door provided with any suitable transparent or translucent material.

After the tea leaves have fallen below the atomizing zone, they pass out through a restricted orifice in the bottom of the container. I prefer, however, to mount a further agitator just above such outlet or orifice which is preferably rotated in an opposite direction to the first mentioned agitator and is driven through suitable means from the same power source as such first agitator. Such second agitator is primarily designed to mix thoroughly the impregnated leaves.

A preferred form of apparatus for carrying out the process of the invention will now be described by way of example with reference to the accompanying drawings in which:

Figure 1 shows a vertical section of the apparatus.

Figure 2 shows a side elevation of the apparatus and

Figures 3 to 8 show details of the apparatus.

Referring to the drawings the container 1 which is in the form of a square metal tube approximately 8 inches square has fitted into the upper end thereof a sheet metal hopper 2 which in its upper part is 20 to 24 inches square into which the tea leaves are fed. The tea leaves proceed to the container 1 by means of the passage 3 the flow of tea being regulated by the sheet metal sliding shutter 4. The free movement of the tea leaves in the hopper is ensured by means of the horizontally mounted brass cylinder 5 which is about 1 inch in diameter and has a plurality of 1/4" diameter pegs 6 on its periphery (see Figure 3). The cylinder 5 is driven through pulleys 7 and 8 and belt 9 by means of the electric motor 10.

The oil is introduced into the container 1 by means of the nozzle 11, a flexible lead 12 connecting the nozzle stem to the supply container 13 of the oil from which the oil is forced by means of the pressure (about 50 lbs. per sq. in.) in the air reservoir 14 which is supplied by the air pump 15. The nozzle 11 is mounted on a door 16 provided in the side of the container 1, the edges of the orifice in the container 1 being provided with beads 17.

The nozzle 11 passes through an orifice in the door 16 to which its shank or stem is secured. The nozzle 11 (see Figures 5 to 8) comprises an enlarged head portion 18 and as the oil passes from the stem into the head 18 it has to pass through a copper colander shaped receptacle 19 which acts as a strainer having a plurality of holes 20 therein. Directly in front of the receptacle 20 is a brass disc 21 provided with two opposed angle slots 22 cut in its edge to impart a whirling movement to the incoming oil. A leather packing ring 23 is disposed between the disc 21 and the oil spray diffuser 24 which is provided with three holes 25, 26 and 27 in vertical alignment. Each of the holes 25, 26 and 27 is of 1/64th inch in diameter and the holes 25 and 27 are bored through the disc 24 at an angle so that the hole 25 tends to spray the atomized oil upwardly while the hole 27 tends to spray the oil downwardly. The various parts within the nozzle are held in position by the screwed retaining cap 28. An inspection door 29 of transparent or translucent material is provided in the wall of the container 1 opposite the nozzle. After the tea leaves have fallen below the atomizing zone they pass out through a restricted orifice 30 in the bottom of the container 1. A further agitator 31 is mounted just above the orifice 30. This is a drum about 2½ inches in diameter and about 8 inches long provided with four fins 32 (see Figure 4) each about 1 inch high. The agitator 31 is driven through the pulleys 33 and 34 and belt 35 by the electric motor 10. This agitator 31 is primarily designed to mix thoroughly the impregnated leaves.

The combined height of the hopper and container is about five feet six inches.

It will be appreciated that the apparatus is not limited to the particular embodiment described but may be modified in various ways. Thus, for example, a cylindrical container and hopper might be employed.

I claim:

A process for treating tea, consisting in moving the tea leaves through a predetermined path and subjecting the leaves while in movement to a spray, delivered under material pressure, of the essential oils of the group of citrus fruits consisting of orange and lemon oil from which the terpenes have been removed.

LEONARD MORTON WRIGHT.